United States Patent [19]

Makiguchi

[11] Patent Number: 5,656,306
[45] Date of Patent: Aug. 12, 1997

[54] STRUCTURE OF ELECTRICALLY HEATABLE BODY ATTACHED TO A MOLD THAT GLUES AND TRIMS A FILM

[75] Inventor: Naoshi Makiguchi, Akasakadai, Japan

[73] Assignee: Sintokogio, Ltd., Japan

[21] Appl. No.: 688,205

[22] Filed: Jul. 26, 1996

[30] Foreign Application Priority Data

Jul. 28, 1995 [JP] Japan ............... 7-212562
Sep. 8, 1995 [JP] Japan ............... 7-257109

[51] Int. Cl.$^6$ .......................................... B29C 51/32
[52] U.S. Cl. .................. 425/504; 156/212; 156/510; 156/530; 264/163; 425/289; 425/388; 425/510
[58] Field of Search ............... 264/163; 425/289, 425/388, 504, 510; 156/212, 214, 510, 530, 515

[56] References Cited

U.S. PATENT DOCUMENTS 3,135,077 6/1964 Siegel et al. ............... 156/515
3,273,203 9/1966 Ross .......................... 264/163
3,294,881 12/1966 Wadlinger ................... 425/388

FOREIGN PATENT DOCUMENTS 3433096 3/1986 Germany ................. 156/530
2-139221 5/1990 Japan ..................... 425/289

*Primary Examiner*—Robert Davis
*Attorney, Agent, or Firm*—Limbach & Limbach L.L.P.

[57] ABSTRACT

A mold assembly is disclosed that has an electrically heatable body, that glues and trims a film, and that minimizes the heat loss of the heatable body. The mold assembly includes a receiving mold (2) formed on the upper part of a frame (1), a non-current-conductive and heat-resistive material (11) disposed at the periphery of the receiving mold and having vertical throughbores (14), an electrically heatable body (5) extending along the throughbores, and metal holders (12) disposed in the throughbores (14) to hold the electrically heatable body (5) in a non-contact relation with the heat resistive material (11) at least at the positions where the holders are.

8 Claims, 3 Drawing Sheets

1

STRUCTURE OF ELECTRICALLY HEATABLE BODY ATTACHED TO A MOLD THAT GLUES AND TRIMS A FILM

FIELD OF THE INVENTION

This invention relates to a mold that by vacuum shaping glues a film to the surface of a formed product and that trims the film by fusing it along the trimming line. This invention relates, in particular, to the structure of an electrically heatable body that acts as a trimmer and that is fixed to a mold that receives a formed product.

DESCRIPTION OF THE PRIOR ART

Surfaces of formed products such as the internal parts for automobiles are generally glued with plastic sheeting, film, or the like to prevent a foamed resin from appearing on their surfaces when it is used to ornament the formed products or when it is used for a later process. Further, fusing the trimming line is done by an electrically heatable body that is fixed to a mold for removing any unnecessary part of the film from the formed product glued with the film.

The electrically heatable body is fixedly mounted on a mold to prevent it from being deformed and shifting, which may come from its repeated expansions and contractions when successively heated. As in FIG. 7, which shows a prior-art metal fixing device or holder, an electrically heatable body 5 is generally fixed to a heat-resistive and non-current-conductive material 11 such as bricks or Teflon with a plurality of inverse U-shaped metal holders 22.

However, when the electrically heatable body 5 is supplied with a current to fuse the film, its temperature at the positions of the metal holders 22 is lower than the other parts, and it fails to fuse the film at the positions.

The cause of the low temperature of the body 5 at the positions seems to be that not only the heat-resistive material 11, but also the metal holders 22, deprive the electrically heatable body 5 of heat there.

This invention is made considering this drawback. It aims to minimize the heat loss of the heatable body at the positions where the holders are.

SUMMARY OF THE INVENTION

In this invention the electrically heatable body is held by metal holders in a non-contact relation with a non-current-conductive and heat-resistive material of the mold. Thus heat loss of the electrically heatable body is minimized at the positions where the holders are. Other features and advantages of the present invention will be apparent from the embodiments of the invention described below in detail by reference to the accompanying drawings.

DESCRIPTION OF THE PREFERRED EMBODIMENTS

Figure 1:
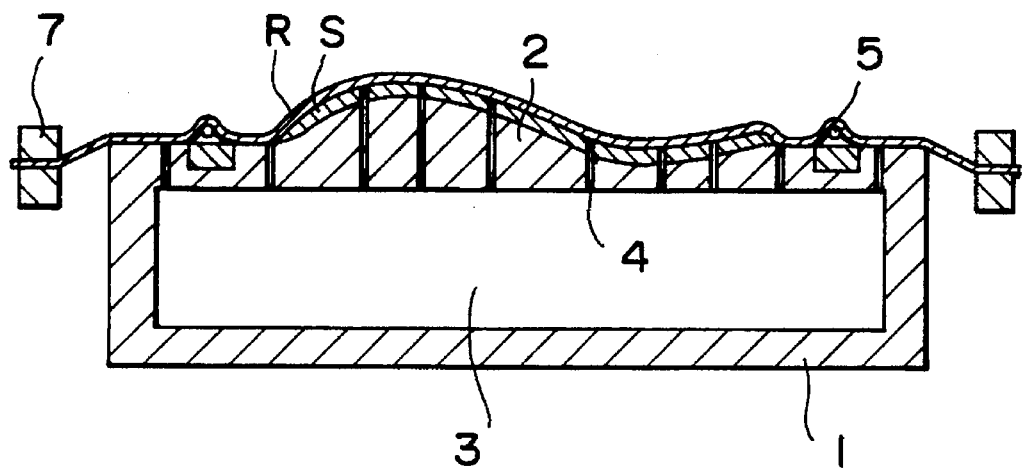
FIG. 1 is a cross-sectional view of the embodiment of the structure of the mold having an electrically heatable body.

FIG. 1 shows the structure in cross section of a mold assembly that glues a film to the surface of a shaped product and that trims or fuses the film along a trimming line. The mold assembly includes a box-like frame 1 and a receiving mold 2 formed on the top of it to receive a shaped product S thereon. The frame 1 and receiving mold 2 define a cavity 3 which communicates with a vacuum source (not shown) disposed outside the mold assembly. The receiving mold 2 is formed with a plurality of vertical throughbores 4 for suction by the vacuum source. An electrically heatable body 5, which is in an annular shape similar to the periphery of the shaped product S, is held, by a plurality of metal holders, in a non-current-conductive and heat-resistive material 11 at the periphery of the top of the receiving mold 2. Number 7 in FIG. 1 denotes a clamper to clamp a film R to be glued to the surface of the shaped product S.

The electrically heatable body 5 is made of a substance that can reach a temperature that can fuse the film when heated. The electrically heatable body 5 is generally a wire or strip made of nickel-chrome alloys, iron-chrome alloys, or nickel-chrome-iron alloys. Preferably, the body 5 is a round wire of a diameter of about 1 mm to 5 mm for ease of shaping and installing.

The shaped product S may be a press-formed product of wooden fibers, or a porous product formed from a PP or ABS resin. In any case, the body 5 is air-permeable.

The film R is made of a plastic and may be colored and/or patterned.

The operation of the mold assembly that glues and trims a film is now explained. First the shaped product S is placed on the receiving mold 2. The surface of the shaped product S is previously supplied with a glue. The film R is held by the clamper 7 above the receiving mold 2 and is heated by a heater (not shown) and softened. The clamper 7 is moved toward the receiving mold 2 to cover the shaped product S by the film R. The vacuum source then operates to suck and glue the film R to the surface of the receiving mold 2. This state is shown in FIG. 1. A current is supplied to the body 5 to heat it. This heated body 5 fuses the film along the trimming line. Finally, the electric supply to the body and the operation of the vacuum source are stopped, and the finished product and the trimmed and unnecessary part of the film are removed from the mold assembly.

Figure 2:
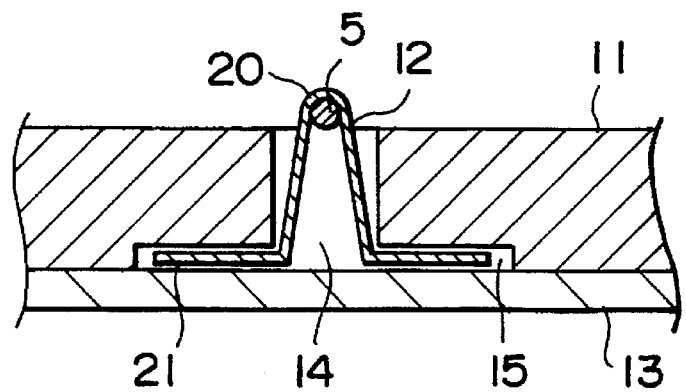
FIG. 2 is a cross-sectional view of an embodiment of the structure of the electrically heatable body to be attached to a heat-resistive material of the mold in FIG. 1.

Below, the structure of the electrically heatable body to be attached to the receiving mold 2 is explained. FIG. 2 is an enlarged view of a part of the receiving mold in FIG. 1. In FIG. 2 number 11 denotes a non-current-conductive and heat-resistive material, 12 denotes a metal holder, 13 denotes a heat insulator, and 14 denotes a vertical throughbore formed in the heat-resistive material 11. A plurality of throughbores 14 are formed in the heat-resistive material along the annular electrically heatable body 5, and one metal holder 12 is put in one throughbore 14. Each throughbore is cylindrical and has a groove or recess 15 formed in the bottom surface of the heat-resistive material 11. Each metal holder 12 is made of a wire, and it has a round hook 20 at the top and two legs 21 at the bottom. Each holder 12 is put in each throughbore 14 with the hook 20 engaging and pressing the electrically heatable body 5 downward and with the legs 21 being in the groove. Since the legs 21 tightly engage the groove 15, the holder 14 is substantially fixed to the heat-resistive material 11, and therefore the heatable body 5 is tightly held by the metal holders 12 on the heat-resistive material 11, thereby preventing the heatable body from shifting. The heatable body 5 does not contact the heat-resistive material 11, at least at the positions of the throughbores 14 or holders 12.

Many experiments were carried out to determine the suitable size of the throughbore 14. It was found that to effectively reduce the heat loss at the holders, the dimension of the throughbore 14 in the longitudinal direction of the heatable body 5 must be greater than twice the dimension of the width of the cross section of the heatable body in a direction transverse of its longitudinal direction. By the reasons stated above, the heatable body is made of round wire, and the diameter of the cylindrical throughbores 14, which are formed by drilling, is generally twice that of the heatable body.

The material of the holders 12 may be a stainless steel, since its quality does not change under high temperatures. If the holders are made of round wires, the material can easily hold the round heatable body. Preferably, the diameter of the wire holders is less than that of the heatable body.

Figure 3:
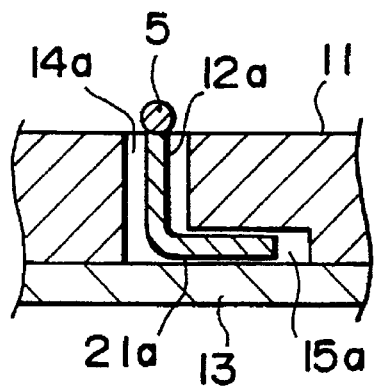
FIG. 3 is a cross-sectional view of another embodiment of the structure of the electrically heatable body to be attached.

Many structures for the holders may be considered other than that in FIG. 2. In FIG. 3 the heatable body 5 is welded to wire holders 12a. Each holder 12a has a leg 21a fitted into a transverse groove or recess 15a of a cylindrical throughbore 14a.

Figure 4:
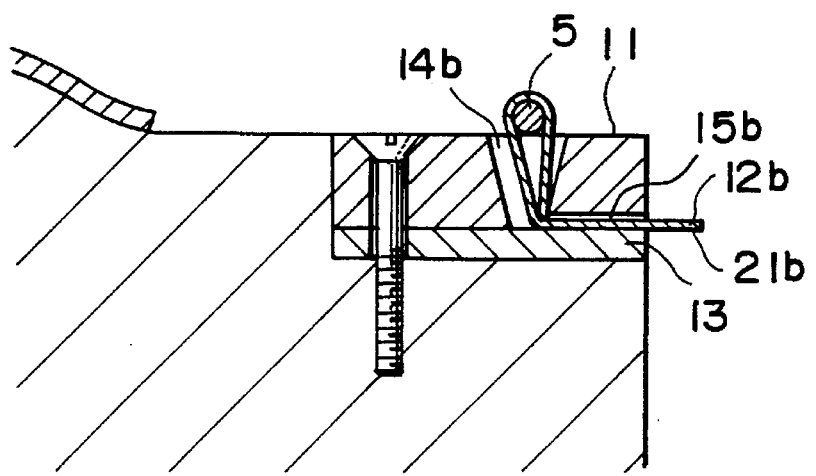
FIG. 4 is a cross-sectional view of still another embodiment of the structure of the electrically heatable body to be attached.

In FIG. 4 a holder 12b is similar to that in FIG. 2, but its two legs 21b extend to the outside of the heat-resistive material 11 through a groove or recess 15b of a throughbore 14b, which opens to the outside of the heat-resistive material 11. Since the heat-resistive material 11 can be fixed to the receiving mold, while pulling the ends of the legs, the heatable body 5 is easy indexed. The throughbore 14b is tapered such that its lower part is smaller than its top part. This structure prevents the holder 12b from shifting.

Figure 5:
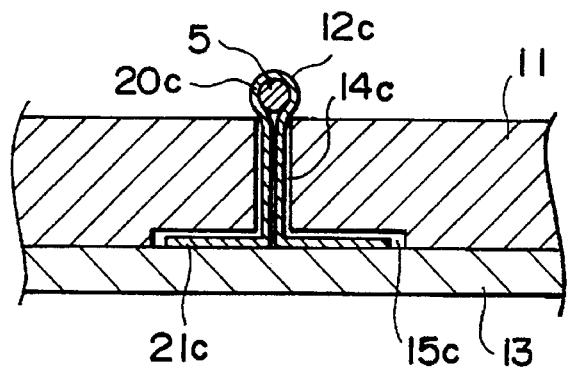
FIG. 5 is a cross-sectional view of still another embodiment of the structure of the electrically heatable body to be attached.
Figure 6:
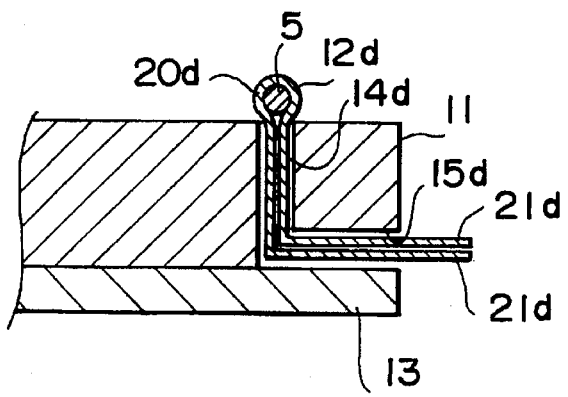
FIG. 6 is a cross-sectional view of still another embodiment of the structure of the electrically heatable body to be attached.
Figure 7:
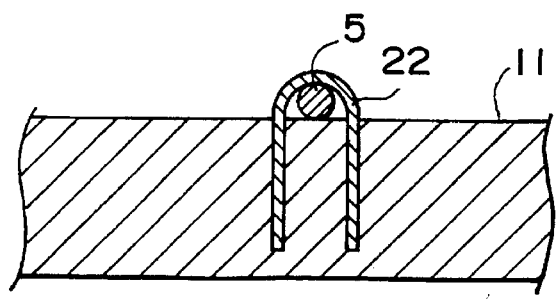
FIG. 7 is a cross-sectional view of the structure of a conventional electrically heatable body to be attached to a heat-resistive material.

In the structures of the metal holders 12c in FIG. 5, and metal holders 12d in FIG. 6, the heatable body 5 is held by the holders 12c or holders 12d above the heat-resistive material 11. Each of the holders 12c and holders 12d is made of wire and is shaped like a hairpin. The round hairpin part 20c or 20d engages and supports the heatable body 5. Two legs 21c of the hairpin-like holder 12c in FIG. 5 engage a groove or recess 15c of a cylindrical throughbore 14c, the same as does the holder 12 in FIG. 2. Two legs 21d of the hairpin-like holder 12d extend to the outside of the heat-resistive material 11 through a groove 15d of a throughbore 14d the same as does the holder 12b in FIG. 4. In the embodiments in FIGS. 5 and 6 the heatable body 5 is supported by the holders above the heat-resistive material 11, i.e., not contacting it. Thus the heat loss of the heatable body is minimized.

What we claim is:

1. A mold assembly that glues a film to a shaped product and that trims the film, comprising:

a receiving mold (2) formed on the upper part of a frame (1) for receiving said shaped product;

a non-current-conductive and heat-resistive material (11) disposed at the periphery of the receiving mold, said heat-resistive material having substantially vertical throughbores (14) formed therein;

an electrically heatable body (5) extending along said throughbores; and metal holders (12) disposed in said throughbores (14) so as to hold said electrically heatable body (5) in a non-contact relation with said heat resistive material (11) at least at the positions where said holders exist.

2. The mold assembly of claim 1, wherein each vertical throughbore has a transverse groove (15), and each holder is made of wire, and wherein said wire at the top thereof engages said electrically heatable body and at the lower part thereof has a leg that extends in said transverse groove.

3. The mold assembly of claim 1, wherein each holder has a hairpin-like part which engages and supports said electrically heatable body.

4. The mold assembly of claim 1, wherein the dimension of each throughbore in the longitudinal direction of said electrically heatable body is greater than twice the dimension of the width of the cross section of said electrically heatable body.

5. The mold assembly of claim 1, wherein the upper part of said throughbore is circular.

6. The mold assembly of claim 1, 4, or 5, wherein the lower part of said throughbore is smaller than the top part thereof.

7. The mold assembly of claim 4, wherein the lower part of said throughbore is smaller than the top part thereof.

8. The mold assembly of claim 5, wherein the lower part of said throughbore is smaller than the top part thereof.

* * * * *